(12) United States Patent
Kunkel et al.

(10) Patent No.: US 12,365,796 B2
(45) Date of Patent: Jul. 22, 2025

(54) MATERIAL FOR PROCESSING IN SELECTIVE LASER SINTERING METHOD

(71) Applicant: Siemens Mobility GmbH, Bayern (DE)

(72) Inventors: Maximilian Kunkel, Herzogenaurach (DE); Manfred Ochsenkühn, Berg (DE); Heinrich Zeininger, Obermichelbach (DE)

(73) Assignee: SIEMENS MOBILITY GMBH, Munich (DE)

( * ) Notice: Subject to any disclaimer, the term of this patent is extended or adjusted under 35 U.S.C. 154(b) by 753 days.

(21) Appl. No.: 16/491,109

(22) PCT Filed: Mar. 2, 2018

(86) PCT No.: PCT/EP2018/055200
§ 371 (c)(1),
(2) Date: Sep. 4, 2019

(87) PCT Pub. No.: WO2018/162354
PCT Pub. Date: Sep. 13, 2018

(65) Prior Publication Data
US 2020/0291227 A1  Sep. 17, 2020

(30) Foreign Application Priority Data

Mar. 6, 2017 (DE) .................. 10 2017 203 586.2
Mar. 10, 2017 (DE) .................. 10 2017 203 962.0

(51) Int. Cl.
*C08L 71/00* (2006.01)
*B29C 64/153* (2017.01)
(Continued)

(52) U.S. Cl.
CPC ............ *C08L 71/00* (2013.01); *B29C 64/153* (2017.08); *B33Y 70/00* (2014.12); *C09K 21/14* (2013.01);
(Continued)

(58) Field of Classification Search
CPC ...... C08G 2261/516; C08G 2261/1452; C08G 2261/722; C08G 18/0828; C08G 75/23;
(Continued)

(56) References Cited

U.S. PATENT DOCUMENTS

2007/0267766 A1  11/2007  Hesse et al. ...................... 264/6
2009/0017220 A1   1/2009  Muller ........................... 427/493
(Continued)

FOREIGN PATENT DOCUMENTS

DE  10 2007 024 469 A1  11/2008  ............ B29C 67/00
RU       2343169 C2       1/2009  ............ C08G 65/40

OTHER PUBLICATIONS

Search Report for International Application No. PCT/EP2018/055200, 11 pages, May 29, 2018.
(Continued)

*Primary Examiner* — Shane Fang
(74) *Attorney, Agent, or Firm* — Slayden Grubert Beard PLLC

(57) ABSTRACT

Various embodiments of the teachings herein include a compound for use in the SLS process comprising: a semicrystalline plastic selected from the group consisting of: polyaryletherketones -PAEK-, polyetherketoneketone -PEKK-, polyetherketone -PEK-, polyetheretherketone -PEEK-; and an amorphous plastic selected from the group consisting of: polyetherimide -PEI-, polyethersulfone -PES-, polyphenylenesulfone -PPSU-, and polysulfone -PSU-. Both the semicrystalline plastic and the amorphous plastic be present as a mixture in the compound.

12 Claims, 9 Drawing Sheets

(51) Int. Cl.
 B29K 71/00    (2006.01)
 B33Y 70/00    (2020.01)
 C09K 21/14    (2006.01)
(52) U.S. Cl.
 CPC .. *B29K 2071/00* (2013.01); *B29K 2995/0016* (2013.01); *C08L 2205/12* (2013.01)
(58) Field of Classification Search
 CPC ..... C08G 75/20; H01B 1/122; H01M 8/1025; H01M 8/1027; C08L 81/06
 See application file for complete search history.

(56) References Cited

U.S. PATENT DOCUMENTS

| 2015/0145168 A1 | 5/2015 | Rodgers | 264/308 |
| 2015/0259530 A1 | 9/2015 | Rodgers | 524/538 |

OTHER PUBLICATIONS

Search Report for German Application No. 10 2017 203 962.0, 8 pages, Nov. 9, 2017.
Russian Office Action, Application No. 2019130328/05, 7 pages, Dec. 18, 2019.

Figure 3

| Tg in °C<br>Heating rate in DSC analysis | PEKK:PEI<br>100:0 | PEKK:PEI<br>70:30 | PEKK:PEI<br>51:49 | PEKK:PEI<br>0:100 |
|---|---|---|---|---|
| 10K/min (Extruder mixture) | 155.9 | | 182.2 | 215.1 |
| 5K/min (Kneader mixture) | | 180.3 | 182.6 | 215.1 |
| 10K/min (Kneader mixture) | | 181.1 | 185.7 | |
| 20K/min (Kneader mixture) | | 183.4 | 187.3 | |

MATERIAL FOR PROCESSING IN SELECTIVE LASER SINTERING METHOD

CROSS-REFERENCE TO RELATED APPLICATIONS

This application is a U.S. National Stage Application of International Application No. PCT/EP2018/055200 filed Mar. 2, 2018, which designates the United States of America, and claims priority to DE Application No. 10 2017 203 962.0 filed Mar. 10, 2017 and DE Application No. 10 2017 203 586.2 filed Mar. 6, 2017, the contents of which are hereby incorporated by reference in their entirety.

TECHNICAL FIELD

The present disclosure relates to additive manufacturing. Various embodiments of the teachings herein may include a material used as starting material for the SLS method, which, as well as exceptional required flame retardancy properties, simultaneously has optimal processability in the SLS method and imparts optimal mechanical properties such as elongation at break, tensile strength, elasticity to the shaped body produced therefrom in the SLS method. The material may be used to fabricate a flame-retardant shaped body producible in the selective laser sintering method, called SLS method for short, meeting the fire protection requirements according to DIN 45545.

BACKGROUND

Materials for production of a shaped body suitable for the mobility sector, i.e. to use a part of the interior trim of a rail vehicle, automobile or aircraft are required, in addition to mere flame retardancy, to protect the passengers and/or of personnel from smoke and/or toxic gases in the event of fire, as set out in DIN standard EN 45545.

The SLS method refers to a process in which plastic in powder form is melted in layers, usually completely, and/or partly melted in the thermoplastic edge regions, and more particularly without use of binders, but rather solely by irradiation with a laser, giving rise to a shaped body with high density after solidification. Typically, pulverulent starting material is melted by a laser, for example a $CO_2$ laser, an Nd:YAG laser or another laser according to a defined component plan in a powder bed.

There is currently no commercial plastic powder for a powder bed for production of a flame-retardant shaped body in the SLS method that meets the standardized fire protection requirements, especially the comprehensive fire protection requirements according to DIN or EN 45545. There is very particularly also no plastic powder for the SLS method that meets the R1 HL 3 fire protection requirements. Plastics that meet the normative demand according to DIN EN 45545 or DIN 60695-11-10-20 or the UL 94 specification have to date been processed predominantly in conventional thermoplastic processing methods, such as injection molding, extrusion, film production and/or by additive methods in fused deposition modeling, FDM methods for short.

Existing plastics having optimized fire protection properties, for example the PEK material from EOS ("PEEK HP3"), that are suitable for the SLS method feature disadvantageous material aging during the process owing to the high construction space/process/ambient temperatures. This results in further properties that are disadvantageous for the process and the shaped body produced, such as:

non-reusability of the residual powder remaining in the powder cake, which is also referred to as used powder, "caking" of the powder, i.e. the formation of a rigid powder cake that makes it difficult to free the shaped body formed from the component, declining mechanical properties of the shaped bodies produced owing to increasing material aging of the layers applied at an early stage, a consequence of the first layer being exposed to the high construction space/ process temperature for longer than that applied last.

SUMMARY

The teaching of the present disclosure may be used to overcome the disadvantages of the prior art. For example, some embodiments include a material which is processible in the SLS method, is usable again for the SLS process and/or reusable thereafter as "used powder", can be detached readily from the powder cake and/or from the shaped body, and is resistant to aging and additionally has good flame retardancy at elevated construction space, process and/or ambient temperatures and imparts good mechanical properties to a shaped body produced therefrom, such as stiffness, tensile strength and/or adequate elasticity.

For example, some embodiments include a material for use in the SLS process, comprising a compound of at least a first semicrystalline plastic selected from the group of the polyaryletherketones -PAEK-, polyetherketoneketone -PEKK-, polyetherketone -PEK-, polyetheretherketone -PEEK- and of a second amorphous plastic selected from the group of polyetherimide -PEI-, polyethersulfone -PES-, polyphenylenesulfone -PPSU- and/or polysulfone -PSU-, including all derivatives of the compounds mentioned, and where both the first plastic and the second plastic may themselves be present as a mixture in the compound.

In some embodiments, the compound is in amorphous morphology prior to the pulverization.

In some embodiments, the amorphous compound is in amorphous and/or semicrystalline morphology after the pulverization.

In some embodiments, the morphology of the compound is alterable from amorphous to semicrystalline by defined exposure to temperature and time.

In some embodiments, the compound includes more than 50% by weight of semicrystalline polyaryletherketone.

In some embodiments, the compound is in powder form suitable for processing by means of SLS methods.

In some embodiments, the powder of the compound includes particles in grain sizes in the range below 100 μm, especially in the range between 30 μm and 80 μm.

In some embodiments, the powder of the compound includes rounded particles.

In some embodiments, the density of the first and/or second plastic for production of the compound is in the range between 1 $g/cm^3$ and 2 $g/cm^3$.

As another example, some embodiments include a flame-retardant shaped body obtainable by processing a powder obtainable from the material as described above in the SLS method, said powder being semicrystalline or having semicrystalline components. In some embodiments, the shaped body is part of an interior trim or outer cladding of a vehicle, ship and/or aircraft. In some embodiments, the shaped body is part of a building, any product and/or a housing.

Some embodiments include the use of a material as described above after pulverization for further processing by the SLS method.

BRIEF DESCRIPTION OF THE DRAWINGS

FIG. 3 shows the glass transition temperatures from the DSC measurements.

DETAILED DESCRIPTION

Figures 1, 2:
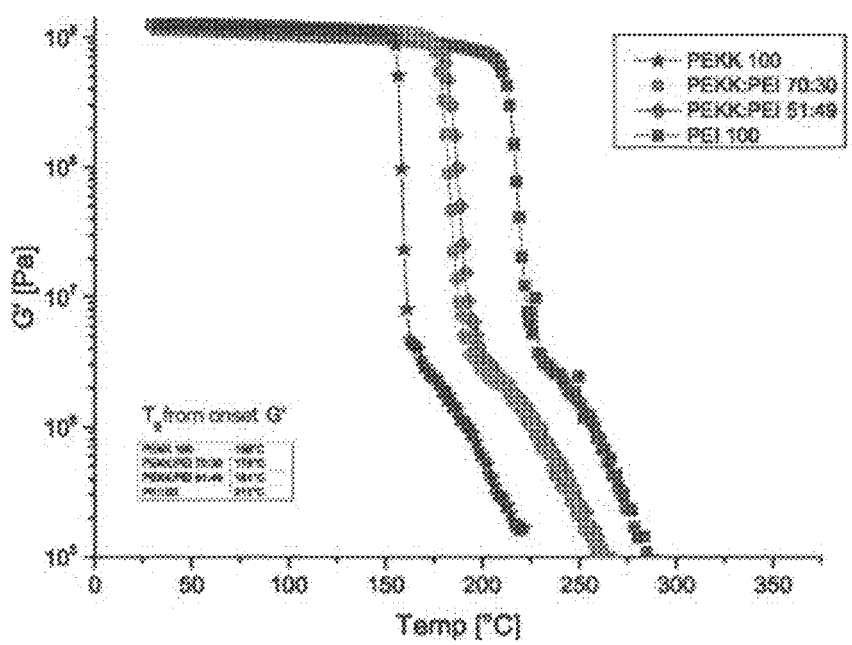
FIG. 1 shows the graph of a DMA measurement of the mechanical shear modulus against temperature.
FIG. 2 shows the glass transition temperatures measured from the DMA.

Some embodiments of the teachings herein include a material for use in the SLS method, comprising a compound of at least a first semicrystalline plastic selected from the group of the polyaryletherketones -PAEK-, polyetherketoneketone -PEKK-, polyetherketone -PEK-, polyetheretherketone -PEEKand of a second amorphous plastic selected from the group of polyetherimide -PEI-, polyethersulfone -PES-, polyphenylenesulfone -PPSU- and/or polysulfone -PSU-, including all derivatives of the compounds mentioned, and where both the first plastic and the second plastic may themselves be present as a mixture in the compound. The present disclosure also describes a flame-retardant shaped body obtainable by processing the powder obtained from the abovementioned material in the SLS method, said material being semicrystalline or having semicrystalline components. Finally, the present disclosure also describes the use of the abovementioned material after pulverization for further processing by the SLS method.

Compounding of a semicrystalline plastic with an amorphous plastic, with a predominant proportion of the semicrystalline plastic, at first gives rise to a compound having amorphous morphology. Further processing steps for pulverization, especially by drying, grinding, sieving and/or rounding, give a powder suitable for use in the SLS method. The powder thus obtained has a distinctly enhanced resistance to aging in the SLS method.

The shaped body obtainable after processing by the SLS method has a semicrystalline material content; this is generally detectable without difficulty via the melting point by an analysis by DSC (differential scanning calorimetry). In addition, it has good mechanical properties and also the required flame retardancy.

Some embodiments of the teachings herein include a material and a compound for pulverization and further processing by the SLS method, wherein the predominant proportion of the compound is in the form of the first semicrystalline plastic, e.g. of PAEK. Proceeding from the fact that semicrystalline PAEK plastics are suitable for the SLS method but have to date not shown mechanical properties adequate for the mobility sector, at least a certain proportion of amorphous, thermally stable second plastics is added. The amorphous plastics themselves give the desired intrinsic flame retardancy but are basically unsuitable for processing by the SLS method because their softening and/or melting and/or solidification properties are unsuitable for the SLS method, in which there is brief melting in order that solidification occurs shortly thereafter.

By contrast, semicrystalline plastics, such as, in particular, the polyaryletherketones PAEK under consideration here, require high process temperatures to enable processibility in the SLS method at all. Owing to these processing temperatures, material aging occurs, which has distinct adverse effects on the mechanical/technological properties of the shaped body and also on the unutilized process powder, also called powder cake and/or used powder.

By the compounding of the two plastic components, the semicrystalline plastic component composed, for example, of polyaryletherketone on the one hand and the amorphous plastic component on the other hand, especially by setting a mixing ratio of the two components at which the proportion of the semicrystalline plastic predominates, i.e. accounts for more than 50% by weight, it is possible to combine the mechanical properties such as elasticity, elongation at break and tensile strength in such a way as to result in an optimal profile of properties for the respective use.

This is all the more astonishing in that it can even be asserted that, with regard to the SLS method, the requirements of 1) fire protection and mechanical durability;
2) mechanical properties and process temperature; and
3) process temperature and recyclability of the residual powder have to date been in conflict.

The demands on high thermal stability and low processing temperature and the high flame retardancy properties for plastics for rail vehicles and/or good mechanical properties can be obtained, for example, with a compound composed of the plastics PEKK6003, especially from the 6000 series from Arkema, and PEI 1010, for example from Sabic, especially from the 1000 series from Sabic. The PEKK, for example of the abovementioned 6000 series, crystallizes gradually and can be processed either in the amorphous state or in the semicrystalline state. When cooled down rapidly, for example, PEKK 6003 is in amorphous morphology. PEKK 6003 is intrinsically flame-retardant and has the lowest processing temperatures within the PAEK group comprising, in particular, PEKK, PEK, PEEK, PEEKEK and derivatives thereof, and any mixtures and/or blends of the aforementioned compounds.

Amorphous PEI has a higher Tg than PAEK and has higher mechanical indices, such as modulus of elasticity or tensile strength, than PEKK 6000 for example, and these are also transferred to the blend. The high demands on flame retardancy are also met with PEI.

In some embodiments, a compound comprises PEKK 6003 and PEI 1010 with a mixing ratio of PEKK>PEI. This may, like the PEKK component itself, either be in amorphous or semicrystalline morphology. In addition, there is a rise in thermal dimensional stability of the shaped body produced therewith as a result of the admixture of PEI with a higher Tg, i.e. glass transition temperature.

In the possible compounds of the PEKK-PEI system, with regard to the mechanical properties such as, in particular, stiffness, measurable via the modulus of elasticity, and/or the tensile strength of the two components, the respective higher values are obtained; in the case of elongation at break, the average of the two components is established. This can be understood by the measurements shown in table 1 below.

TABLE 1

|  |  | PEKK e.g. Kepstan 6003 | PEI e.g. Ultem 1010 | PEKK:PEI 51:49% by wt. mixture |
| --- | --- | --- | --- | --- |
| Modulus of elasticity | MPa | 1977 | 1874 | 1981 |
| Tensile strength | MPa | 97 | 105 | 105 |
| Nominal elongation at break | % | 164 | 28.3 | 58 |

The values were measured on small tensile bars merely for comparative purposes. Therefore, the table shown here is not comparable with data sheet values. In addition, the compounding achieves a distinct rise in the glass transition temperature of the pure PEKK, which leads to a distinct improvement in the profile of properties of the shaped body produced therefrom at higher temperatures, i.e. the result is an increase in dimensional stability by about 20 K compared to pure PEKK.

FIG. 1 shows the graph of a DMA measurement of the mechanical shear modulus against temperature. Pure PEKK shows a distinct drop at about 156° C., pure PEI at about 220° C., and the mixtures between 178° C. (70:30) and 181° C. (51:49). In addition, FIG. 2 shows the glass transition temperatures measured from the DMA. The table shown in FIG. 3 once again explicitly gives the glass transition temperatures from the DSC measurements.

By virtue of the two components generally having intrinsic flame retardancy, the compound is also intrinsically flame-retardant to a high degree. First studies have additionally shown that the material in the SLS method is still processible well below the melting temperature of the semicrystalline component, which, in the case of PEKK, for example of the abovementioned 6000 series, is 300-305° C. Typically, the construction space temperatures of semicrystalline materials are only slightly, i.e. about 2° C.-5° C. for example, below the melting point. Via the new morphology of the mixture, it is even possible here to achieve construction space temperatures of below 280° C. to below 260° C.

This in turn leads to a distinct reduction in aging of the SLS reactant powder during the long construction time and hence to distinctly higher reusability of the used powder. It can be assumed that "used powders" according to the present disclosure in some cases actually achieve the profiles of properties within the range of the new powder, i.e. of the powder not yet heated and irradiated in the SLS method.

The compound ready for use in the SLS method, composed of the at least two plastics mentioned above, is obtainable as a compound, for example, from the respective reactant polymers in pellet form by compounding—again by way of example—in the molten phase. In tests, it has been found that there is no longer any semicrystalline phase of the polyaryletherketone at least in some compounds produced by way of example; instead, the compound has an amorphous morphology. It is assumed that the semicrystallinity is only reestablished again on grinding and/or rounding for production of the processible powder and/or only in the processing of the compound as a powder in the SLS method owing to the effect of temperature/time.

The powder grain sizes of the powder produced from the compound for processing by the SLS method are within the range customary for the SLS method of less than 100 μm, especially in the range from 30 μm to 80 μm, especially around 50 μm. Particularly suitable powder forms are those that show a certain flowability in order that they are better processible in a powder bed, for example with a doctor blade. For this purpose, in some embodiments of the teachings herein, the powder grains are in rounded form.

In the powder suitable for SLS, composed of semicrystalline and amorphous plastic, the two plastics are in a concentration by weight, with the semicrystalline plastic always predominant. A suitable mixing ratio has been found to be the range between semicrystalline to amorphous such as approximately 80:20% by weight. More particularly, the mixing ratio of 70% by weight:30% by weight to 60% by weight:40% by weight and a nearly half-and-half mixing ratio of 51% by weight of the semicrystalline plastic to 49% by weight of the amorphous plastic, all figures in percent by weight.

The density of the reactant polymers used for production of the compound may be in the range from 1 g/cm$^3$ to 2 g/cm$^3$, or in the range from 1 g/cm$^3$ to 1.5 g/cm$^3$, where the percentages by volume in the case, for example, of a PEKK-PEI compound in which the density of the two plastic components is 1.27 g/cm$^3$ correspond to the percentages by weight. The following mixtures listed in table 2 below have been tested by way of example for compounding:

TABLE 2

| Semicrystalline polyaryletherketone (% by wt.) | Amorphous plastic (% by wt.) |
| --- | --- |
| PEKK (70) | PEI (30) |
| PEKK (51) | PEI (49) |
| PEKK (30) | PEI (70) |
| PEKK (50) | PEI (50) |

Compounds in which the proportion of second amorphous plastic predominates have been found to be less suitable for the SLS method.

The teachings of the present disclosure are elucidated in detail hereinafter with reference to further measurements that show the melting and solidification characteristics of illustrative embodiments of the compounds and/or shaped bodies produced therefrom by comparison with the reactant polymers in pure form. The compounds may also be in any other mixing ratios within the scope of the invention. The melting point temperatures and crystallization points are reported in ° C.

Figure 4:
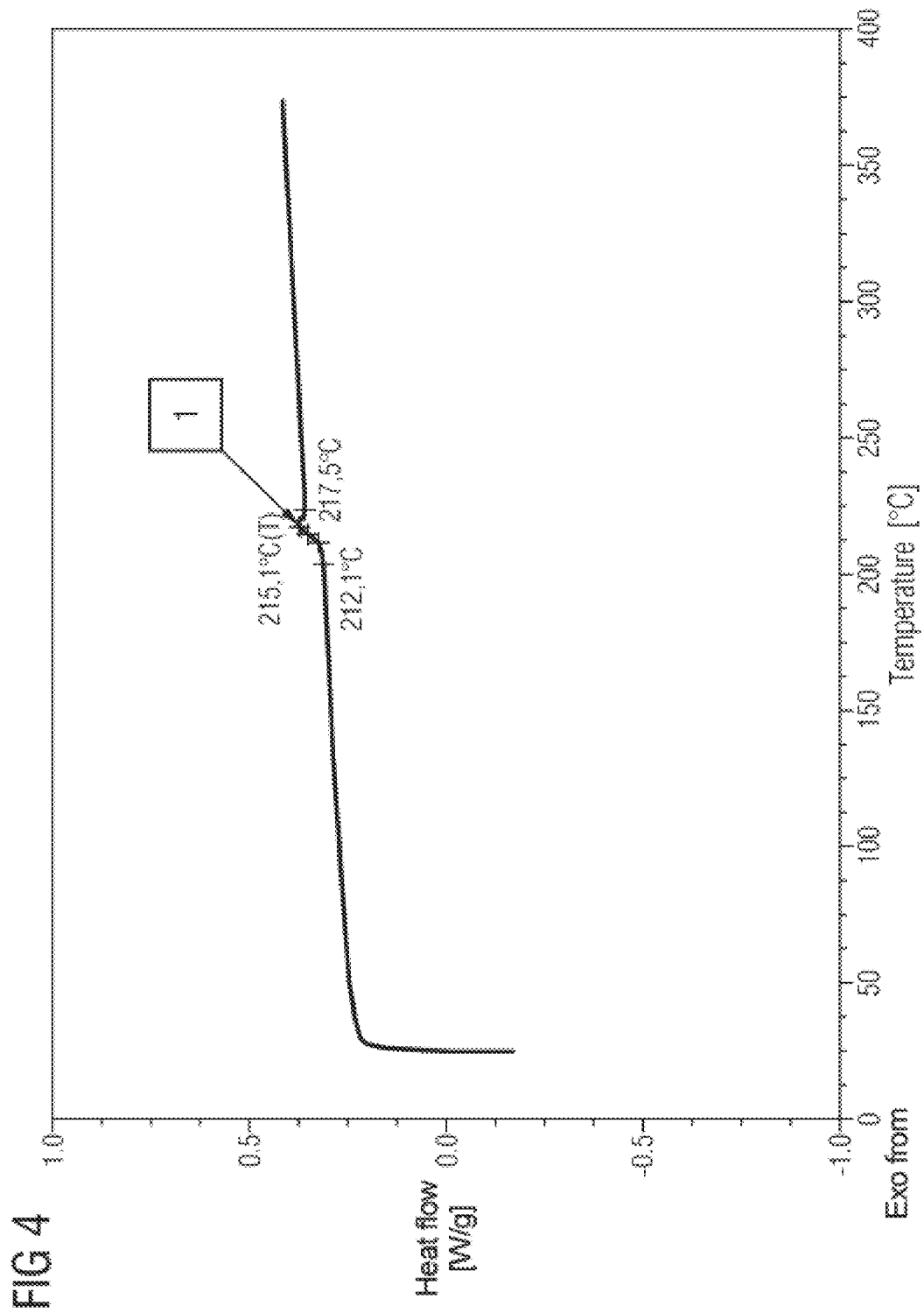
FIG. 4 shows a DSC analysis of a conventional PEI at a heating rate of 10 K/minute.

FIG. 4 shows a DSC analysis of a conventional PEI at a heating rate of 10 K/minute. In the graph of a DSC analysis shown in FIG. 4, the heat flow in watts per gram (W/g) is plotted against temperature in ° C. Celsius. In FIG. 4, the glass transition temperature 1 between 212 and 217° C. is apparent. Since the material is amorphous, no melting point is found in the spectrum and, consequently, it is also not possible to calculate an enthalpy of fusion, known as the area under the melt peak in the DSC spectrum.

Figure 5:
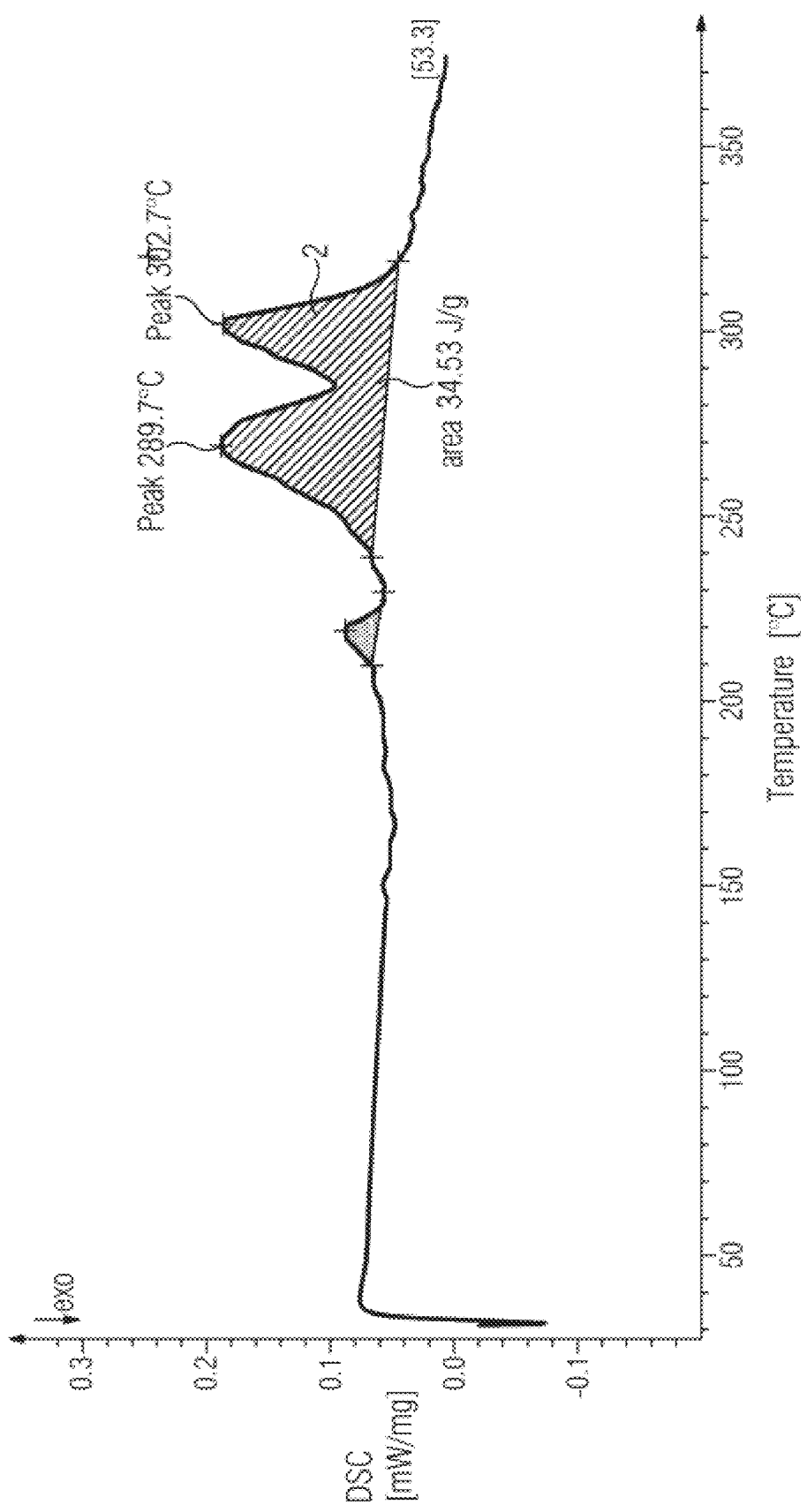
FIG. 5 shows a DSC analysis of a commercial semicrystalline component: a polyetherketoneketone, PEKK 6003.

FIG. 5 shows a DSC analysis of a commercial semicrystalline component: a polyetherketoneketone, PEKK 6003. At the heating rate of 10 K/min, the double fusion peak 2 with a clearly determinable area 2 is clearly apparent, from which the enthalpy of fusion is calculable. Only in the case of polymeric substances in semicrystalline form is it possible to calculate the enthalpy of fusion in this way by means of DSC. The semicrystallinity of this commercially available compound is in the range between 20% and 30%, especially between 25% and 30%. The manufacturer reports a semicrystallinity of about 27%, which can be confirmed in that respect by the measurement present in FIG. 5.

Figure 6:
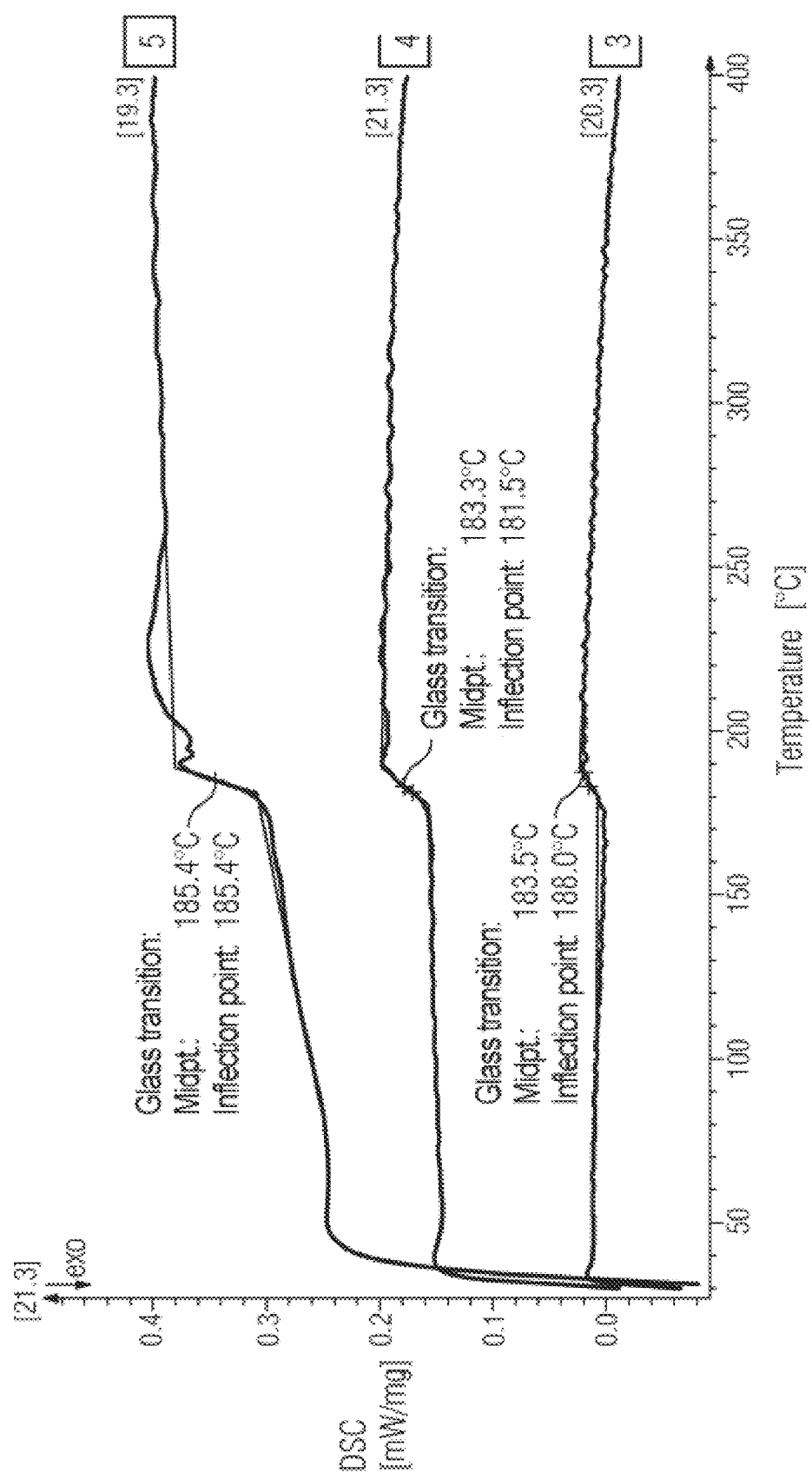
FIGS. 6 and 7 show the DSC spectra of the compounds composed of PEKK and PEI.
Figure 7:
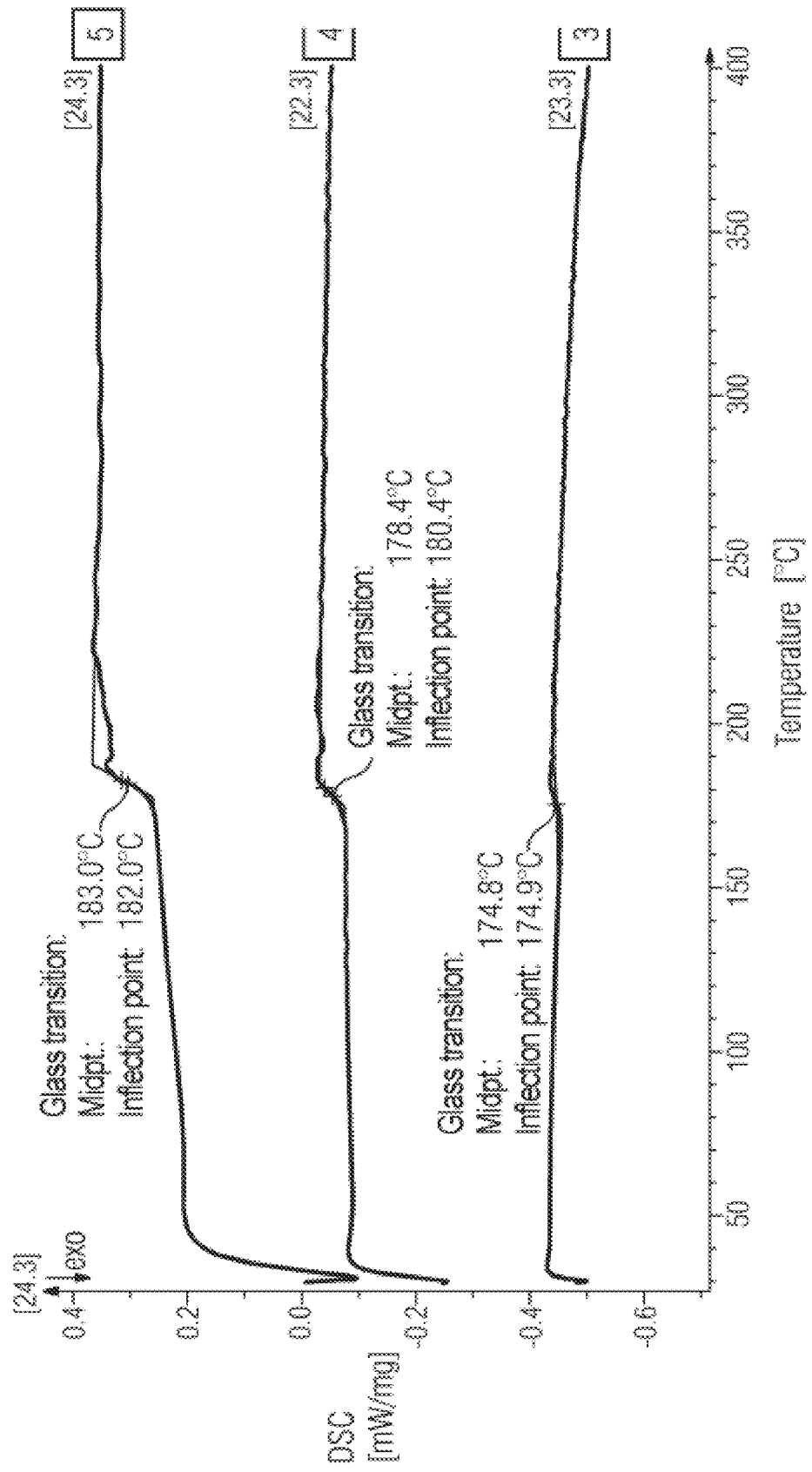

FIGS. 6 and 7 show the DSC spectra of the compounds composed of PEKK and PEI. FIG. 6 shows a compound composed of 51% PEKK and 49% PEI. As in FIG. 4, all that is apparent is a glass transition temperature, but no melting point and also no fusion peak with a calculable area under the peak. Therefore, the compound analyzed here, from which the material processible in the SLS method is obtained, is amorphous.

Different heating rates are shown by graph 3 right at the bottom, which shows the progression at a heating rate of 5 K/min, and above that by graph 4, which shows the progression at a heating rate of 10 K/min, and above that by graph 5, which shows the progression at a heating rate of 20 K/min. In all three cases, only a glass transition temperature and no melting point is apparent, and so the compound is amorphous, without semicrystalline components.

FIG. 7 shows the same measurements with graphs 3, 4 and 5, which again show the abovementioned heating rates. However, the compound that was analyzed here has a proportion of 70% PEKK and 30% PEI. The result is the same again; after the compounding, no fusion peak is apparent and therefore no semicrystalline fraction is detectable either. The compound is likewise in amorphous form, like that analyzed in FIG. 6.

Figure 8:
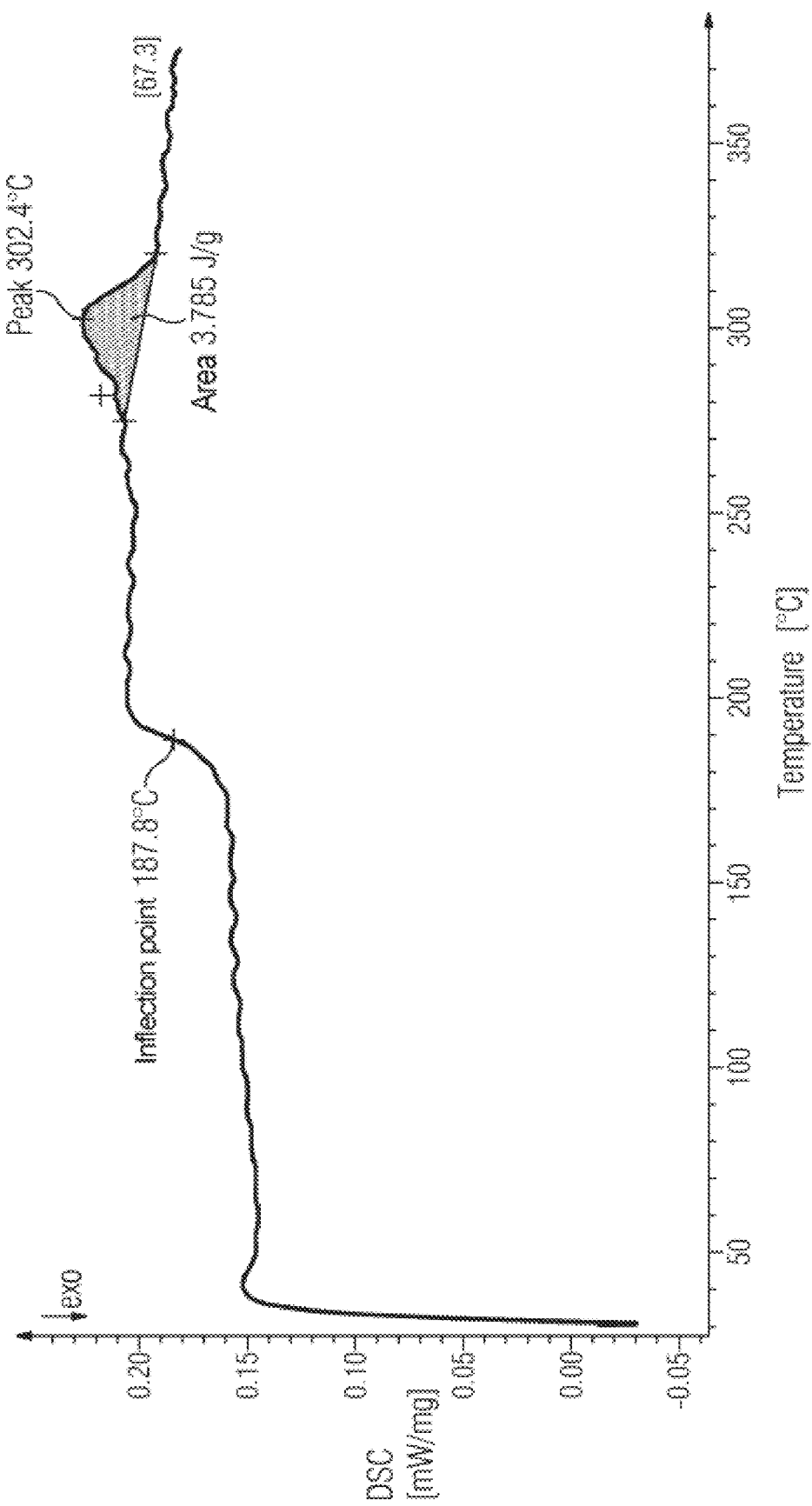
FIG. 8 shows a molding obtained after compounding of a compound composed of 51% PEKK and 49% PEI.

For production of the shaped body, powders that were produced from the two compounds analyzed in FIGS. 6 and 7 were processed by the SLS method. Subsequently, the shaped bodies were also analyzed by the DSC method. The result can be seen in FIGS. 8 and 9. FIG. 8 shows a molding obtained after compounding of a compound composed of 51% PEKK and 49% PEI, and processing of the compound to give a powder with which a shaped body was produced by means of SLS methods.

In FIG. 8, it is apparent that semicrystalline fractions are present in the shaped body. A clear fusion peak is apparent, at 302.4° C., which can be assigned to the PEKK. By calculating the area under the fusion peak, it is possible to determine the enthalpy of fusion; in this case it is 3.8 J/g.

Figure 9:
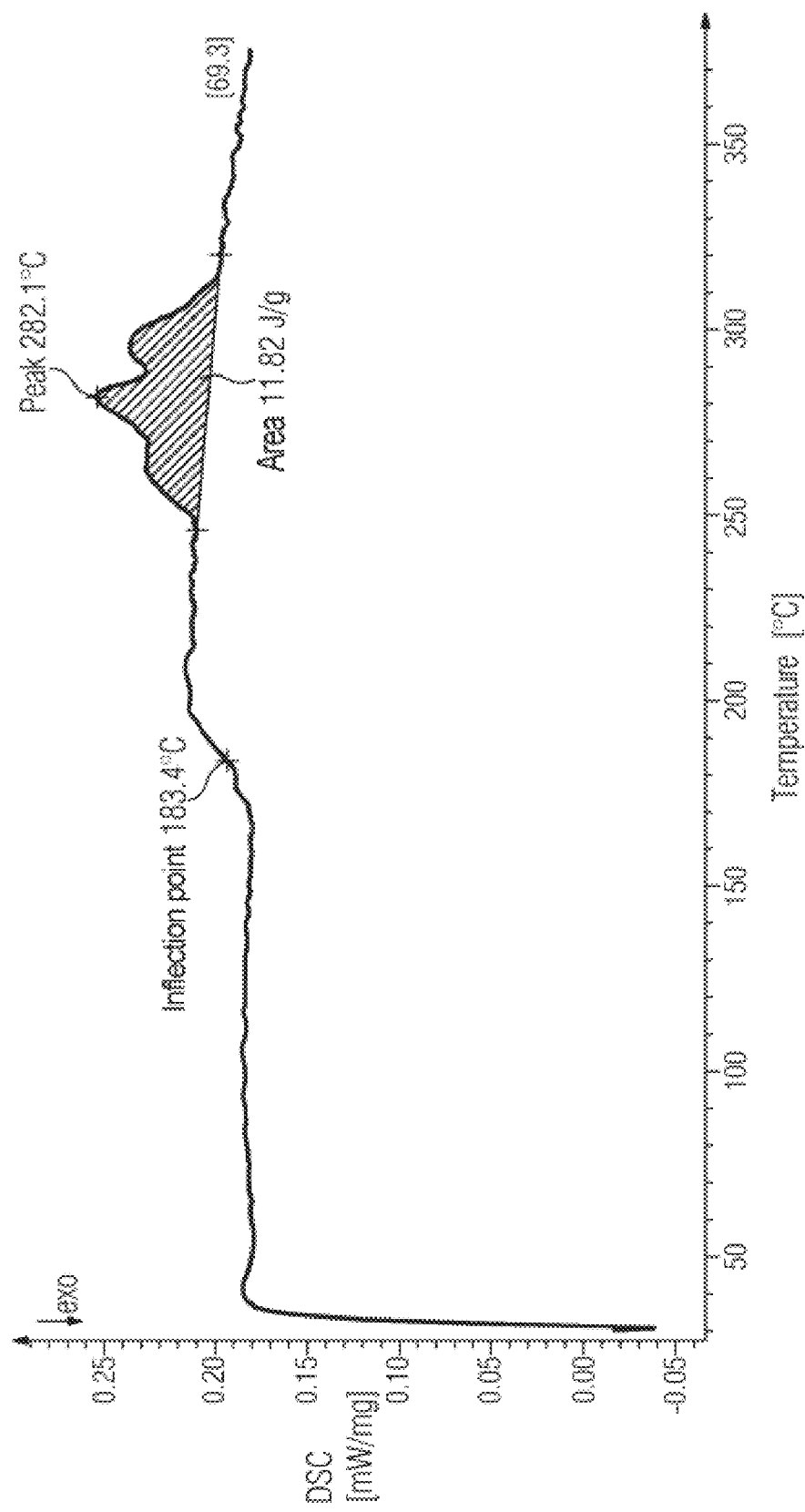
FIG. 9 shows the same measurement as known from FIG. 8, with a compound and a shaped body composed of 70% PEKK and 30% PEI that has been produced therefrom by the SLS method.

FIG. 9 shows the same measurement as known from FIG. 8, with a compound and a shaped body composed of 70% PEKK and 30% PEI that has been produced therefrom by the SLS method. Again, a melting peak is clearly apparent and, by calculating the area beneath it, it is possible to determine an enthalpy of fusion of about 11.8 J/g.

In summary, the conclusion can be drawn from the measurements that semicrystalline fractions in the shaped body are detected over and above a mixing ratio of PEKK in the semicrystalline state to PEI in the amorphous state such as 51:49. In relation to the enthalpy of fusion, experiments show that the higher the enthalpy of fusion of the compound, the better the processibility in the SLS method. In general, it has been found that a compound having an enthalpy of fusion of not less than 3 J/g is of better suitability for processing by the SLS method.

For testing of the mechanical properties, illustrative blends were subjected to further different tests according to DIN EN ISO 527-1/-2 in the form of small tensile bars. The following measurement results were obtained:

Measurement by "Zwick Z2.5"; "2.0 kN transducer"; "10 mm/min"; "Measurement by Zwick Z2.5" is understood to mean a measurement with an eponymous Zwick tensile tester which is well-known for the purpose among specialists; where "2.0 kN transducer" refers to a 2.0 kilonewton transducer and "10 mm/min" is the strain rate and/or speed of movement in mm/min in approximate accordance with DIN EN ISO 527-1/-2, and the "small tensile bars" again refer to tensile specimens having a size of 4×1.5 mm$^2$. The size of the tensile specimens does not conform to a standard, but it is of course only the relative comparison that is being measured here.

Pretreatment of the Test Specimens:

Drying at 120° C. for 8 hours, then heat treatment at 23° C./50 r.h. for at least 96 hours.

The material has to be not just flame-retardant but also has to have mechanical/technical properties that are particularly good by virtue of the material, as clearly shown by the measurements below.

Figure 10:
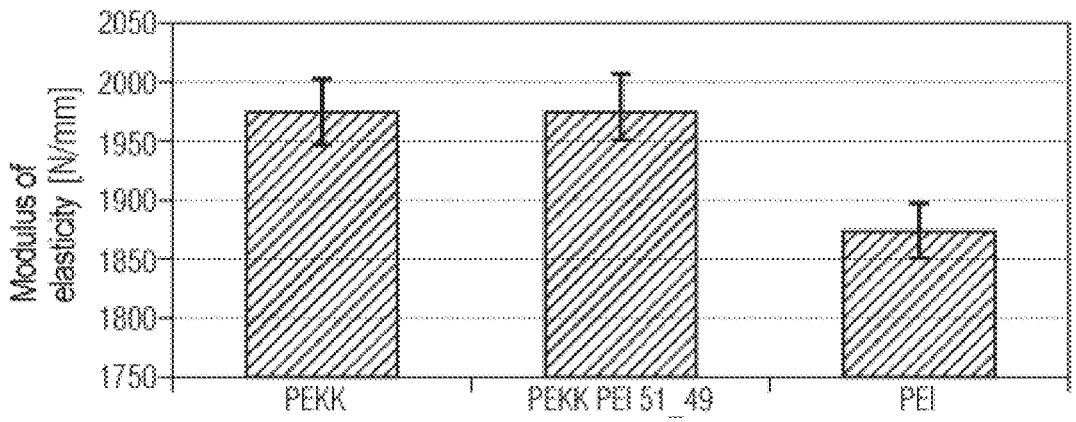
FIGS. 10 to 12 show graphs of the results of the measurement of modulus of elasticity, the measurement of tensile strength, and the measurement of nominal elongation at break of samples of the materials taught herein.
Figure 11:
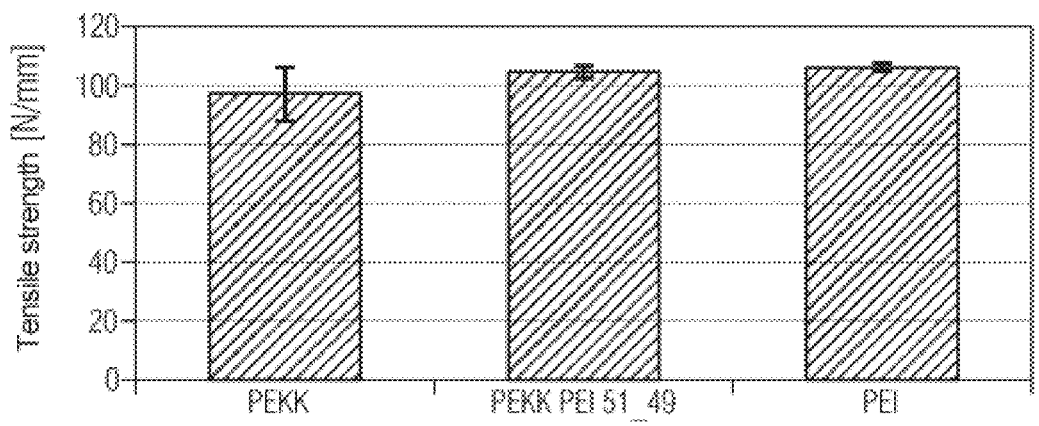
Figure 12:
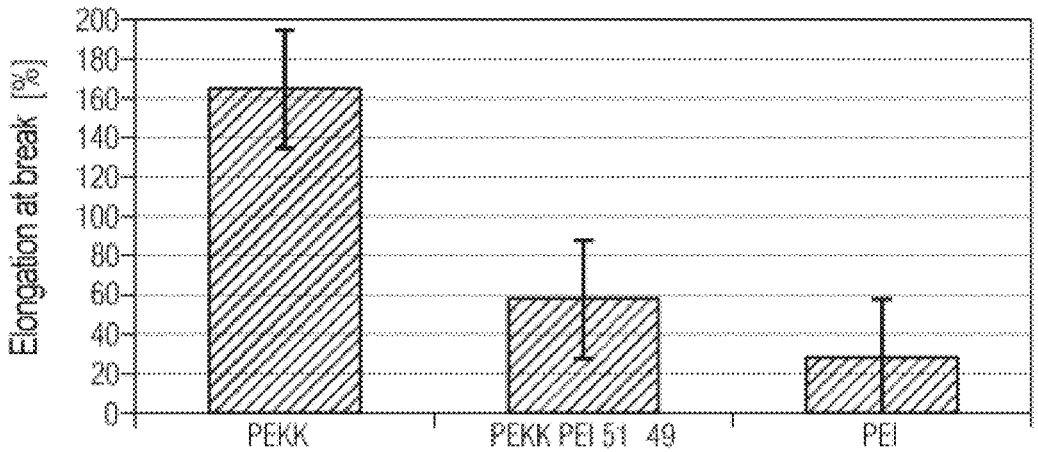

FIGS. 10 to 12 show the graphs in this regard, which show the results of the measurement of modulus of elasticity, the measurement of tensile strength and the measurement of nominal elongation at break. Likewise assessed was the reusability and the ease of parting of the powder from the powder cake. It was found that the powder used in the process is suitable for reusability and no significant aging occurs. The exposure of the shaped body from the powder cake after the performance of the SLS method was likewise unproblematic. No "caking" of the powder takes place.

The compounds are all processible in the SLS method to give shaped bodies having considerable use potential. Examples of uses are in road vehicles, rail vehicles, interior trim and/or housings and/or housing parts of a wide variety of different products, and generally parts for outward configuration of a product. The measurements and test results show that the compounds are basically suitable for processing by the SLS method. However, it is also clear from the data that not all mixtures show the same properties for the SLS process and, more particularly, that higher contents of semicrystalline plastic have a higher enthalpy of fusion and/or a higher degree of crystallinity, which is advantageous for the shaped bodies produced by the SLS method.

There follows a detailed elucidation of an example for production of an embodiment of an illustrative compound according to the invention by a compounding method:

In the mixing of the plastics, i.e. of the reactant polymers, these are used as commercially available, for example. By means of two or more separate metering balances, these materials are introduced into the funnel via the intake zone of a twin-screw extruder/kneader. The pair of screws beneath conveys the material within the barrel to the exit zone. The temperatures of the zones for all material mixtures are uniform at about 320-330° C. The screws consist of individual insertable elements and can be matched to the respective compounding task. In this case, kneading blocks are used to melt the materials and homogenize the mixture, and mixing elements to improve the dispersion.

In principle, it would be possible to mix the materials in pellet form and/or in powder form with further additional additives. Metered addition to the twin-screw extruder can be effected as a dry mixture, via individual balances and/or at different points. Discharge is effected in the form of a molten strand through a die, and the strand is then cooled rapidly in a water bath and then processed in a cutting pelletizer to give pellets that are used for further processing. According to the discharge volume, there is variation here in the extruder size and/or the number of strands.

The compound thus obtained is provided in dried pellet form for the grinding process. Standard methods alternate between various grinding methods, for example hammer milling, roller milling, rod milling, ball milling, attrition milling, grinding milling and/or direct jetting of the mixed polymer melt with subsequent separations and/or sieving operations. Advantageous grinding takes place in a cryogenic environment. The grinding of the present material systems leads to splintered and fibrous particles, and so, for better processing by the SLS process, rounding of the particles is conducted in the grinding drum and/or in a separate reprocessing step.

The shaped bodies produced with the abovementioned powders as starting materials by the SLS method are flame-retardant without addition of further additives, especially intrinsically flame-retardant.

The invention claimed is:

1. A compounded material for use in a selective laser sintering (SLS) process, the compounded material comprising:
    a semicrystalline plastic comprising a polyaryletherketone (-PAEK-); and
    an amorphous plastic selected from the group consisting of: polyetherimide (-PEI-), polyethersulfone (-PES-), polyphenylenesulfone (-PPSU-), and polysulfone (-PSU-);
    wherein the semicrystalline plastic outweighs the amorphous plastic before the semicrystalline plastic and the amorphous plastic are pulverized together to form the compounded material;
    wherein compounded material has a higher glass transition temperature than the semicrystalline plastic alone; and
    wherein the compounded material has either no hot crystallization temperature or a hot crystallization temperature equal to or greater than a respective hot crystallization temperature of the semicrystalline plastic and of the amorphous plastic.

2. The compound as claimed in claim 1, wherein the compound has an amorphous morphology prior to pulverization.

3. The compounded material as claimed in claim 1, wherein the compound has an amorphous and/or semicrystalline morphology after pulverization.

4. The compound as claimed in claim 1, wherein a morphology of the compound is alterable from amorphous to semicrystalline by defined exposure to temperature and time.

5. The compounded material as claimed in claim 1, wherein the compound comprises more than 50% by weight semicrystalline polyaryletherketone.

6. The compounded material as claimed in claim 1, wherein the compound comprises a powder suitable for processing by SLS methods.

7. The compounded material as claimed in claim 1, wherein the compound comprises a powder with particles in grain sizes below 100 µm.

8. The compounded material as claimed in claim 1, wherein the compound includes powder with rounded particles.

9. The compounded material as claimed in claim 1, wherein a density of the semicrystalline and/or the amorphous plastic is in the range between 1 g/cm$^3$ and 2 g/cm$^3$.

10. A flame-retardant shaped body formed by processing a powder, the powder comprising:
    a semicrystalline plastic selected from the group consisting of: polyaryletherketone (-PAEK-), polyetherketoneketone (-PEKK-), and polyetheretherketone (-PEEK-); and
    an amorphous plastic selected from the group consisting of: polyetherimide (-PEI-), polyethersulfone (-PES-), polyphenylenesulfone (-PPSU-), and polysulfone (-PSU-);
    wherein the semicrystalline plastic outweighs the amorphous plastic before the semicrystalline plastic and the amorphous plastic are pulverized together to form the compounded material; wherein compounded material has a higher glass transition temperature than the semicrystalline plastic alone; and wherein the compounded material has either no hot crystallization temperature or a hot crystallization temperature equal to or greater than a respective hot crystallization temperature of the semicrystalline plastic and of the amorphous plastic.

11. The shaped body as claimed in claim 10, wherein the shaped body comprises part of an interior trim or outer cladding of a vehicle, ship, and/or aircraft.

12. The shaped body as claimed in claim 10, wherein the shaped body comprises part of a building, any product, and/or a housing.

* * * * *